United States Patent
Kumar et al.

(10) Patent No.: US 9,606,022 B2
(45) Date of Patent: Mar. 28, 2017

(54) SYSTEMS AND METHODS FOR DIAGNOSING ENGINE COMPONENTS AND AUXILIARY EQUIPMENT ASSOCIATED WITH AN ENGINE

(71) Applicant: General Electric Company, Schenectady, NY (US)

(72) Inventors: Ajith Kumar, Erie, PA (US); Somakumar Ramachandrapanicker, Bangalore (IN); Paul Flynn, Erie, PA (US); Arijit Banerjee, Cambridge, MA (US); Rupam Mukherjee, Bangalore (IN)

(73) Assignee: General Electric Company, Schenectady, NY (US)

( * ) Notice: Subject to any disclaimer, the term of this patent is extended or adjusted under 35 U.S.C. 154(b) by 355 days.

(21) Appl. No.: 14/211,313

(22) Filed: Mar. 14, 2014

(65) Prior Publication Data

US 2015/0355054 A1    Dec. 10, 2015

Related U.S. Application Data

(63) Continuation-in-part of application No. PCT/US2012/053473, filed on Aug. 31, 2012, and a
(Continued)

(51) Int. Cl.
*G01M 15/02* (2006.01)
*B61C 17/12* (2006.01)

(52) U.S. Cl.
CPC .......... *G01M 15/02* (2013.01); *B61C 17/12* (2013.01)

(58) Field of Classification Search
CPC ........ G01M 15/05; G01M 15/00; B61C 17/12

USPC ... 701/22, 29.1, 29.4, 29.5, 29.6, 30.2, 30.5, 701/30.6, 30.7, 34.3, 34.4, 32.9, 99, 101, 701/102, 114; 455/277.1, 422.1, 562.1;
(Continued)

(56) References Cited

U.S. PATENT DOCUMENTS

| 3,877,003 A | 4/1975 | Kawashima et al. |
| 4,334,427 A | 6/1982 | Armstrong |

(Continued)

FOREIGN PATENT DOCUMENTS

| AT | 9466 U1 | 10/2007 |
| CN | 1074868 A | 8/1993 |

(Continued)

OTHER PUBLICATIONS

Thomson et al., "Current and Vibration Monitoring for Fault Diagnosis and Root Cause Analysis of Induction motor Drives", Proceedings of the Thirty-First Turbomachinery Symposium, 2002.*
(Continued)

*Primary Examiner* — Lisa Caputo
*Assistant Examiner* — Nathaniel T Woodward
(74) *Attorney, Agent, or Firm* — John A. Kramer; Global Patent Operation

(57) ABSTRACT

Diagnosing equipment coupled to a generator. A condition of the equipment is diagnosed based on information provided by signals from a generator operationally connected to the equipment or other signals associated with an engine. Different types of degradation are distinguished based on discerning characteristics within the information. Thus, a degraded equipment component can be identified in a manner that reduces service induced delay.

17 Claims, 9 Drawing Sheets

Related U.S. Application Data continuation-in-part of application No. PCT/US2012/053495, filed on Aug. 31, 2012, and a continuation-in-part of application No. PCT/US2012/053499, filed on Aug. 31, 2012.

(58) Field of Classification Search
USPC ...... 370/328, 329, 465; 323/208; 379/93.06, 379/93.09; 340/854.3; 381/315; 414/706, 713; 123/406.24, 406.26, 123/406.27, 406.41, 406.42, 406.43, 435, 123/679, 687; 73/114.58, 114.62, 114.61, 73/114.77, 114.02, 114.04, 114.11, 73/114.15, 114.23, 114.59; 318/139, 254, 318/430, 432, 400.12
See application file for complete search history.

(56) References Cited

U.S. PATENT DOCUMENTS

| | | | |
|---|---|---|---|
| 5,056,487 A | 10/1991 | Yamakado et al. | |
| 5,216,915 A | 6/1993 | Sakamoto | |
| 5,383,107 A * | 1/1995 | Hopkins | H02M 7/5395 363/41 |
| 5,461,289 A | 10/1995 | Adler et al. | |
| 5,509,302 A | 4/1996 | Drexel et al. | |
| 5,592,388 A | 1/1997 | Bradshaw et al. | |
| 5,711,272 A | 1/1998 | Maegawa et al. | |
| 5,728,941 A | 3/1998 | Yamamoto et al. | |
| 5,860,800 A | 1/1999 | Kramer et al. | |
| 6,021,758 A | 2/2000 | Carey et al. | |
| 6,023,651 A | 2/2000 | Nakayama et al. | |
| 6,427,656 B1 | 8/2002 | Drecq et al. | |
| 6,490,511 B1 | 12/2002 | Raftari et al. | |
| 6,510,731 B2 | 1/2003 | Schricker et al. | |
| 6,658,346 B2 | 12/2003 | Maegawa | |
| 6,968,268 B2 | 11/2005 | Yamada et al. | |
| 7,133,766 B2 | 11/2006 | Kokubo | |
| 7,197,916 B2 | 4/2007 | Matsumoto et al. | |
| 7,530,261 B2 | 5/2009 | Walters | |
| 7,669,559 B2 | 3/2010 | Aoyama et al. | |
| 7,761,223 B2 | 7/2010 | Wang et al. | |
| 9,109,517 B2 | 8/2015 | Banerjee et al. | |
| 2001/0054890 A1 | 12/2001 | Thibedeau et al. | |
| 2002/0050271 A1 | 5/2002 | Hasegawa et al. | |
| 2002/0148441 A1 | 10/2002 | Tuken | |
| 2003/0089338 A1 | 5/2003 | Remele et al. | |
| 2004/0148926 A1 | 8/2004 | Morinaga et al. | |
| 2004/0199348 A1 | 10/2004 | Hitchcock et al. | |
| 2005/0204805 A1 | 9/2005 | Wakahara et al. | |
| 2005/0229904 A1 | 10/2005 | Hagel et al. | |
| 2006/0047408 A1 * | 3/2006 | Kayser | F02D 29/06 701/114 |
| 2007/0250288 A1 | 10/2007 | Maier-Landgrebe | |
| 2008/0296896 A1 | 12/2008 | Spenceley et al. | |
| 2008/0303459 A1 | 12/2008 | Furukawa et al. | |
| 2009/0025992 A1 | 1/2009 | Hayashi et al. | |
| 2009/0120174 A1 | 5/2009 | Nodera et al. | |
| 2009/0139781 A1 | 6/2009 | Straubel | |
| 2009/0229355 A1 | 9/2009 | Shoda | |
| 2010/0066097 A1 | 3/2010 | Verdejo et al. | |
| 2010/0131172 A1 | 5/2010 | Willi et al. | |
| 2010/0162797 A1 | 7/2010 | Summers et al. | |
| 2010/0207634 A1 * | 8/2010 | Wang | H02P 29/0241 324/509 |
| 2010/0211296 A1 | 8/2010 | Saunders | |
| 2011/0153128 A1 | 6/2011 | Wright et al. | |
| 2011/0273148 A1 | 11/2011 | Ueno et al. | |
| 2012/0059544 A1 | 3/2012 | Kinoshita et al. | |
| 2012/0123709 A1 | 5/2012 | Chen et al. | |
| 2012/0303259 A1 | 11/2012 | Prosser | |
| 2013/0020993 A1 | 1/2013 | Taddeo et al. | |
| 2013/0300334 A1 * | 11/2013 | Tooyama | H02M 1/12 318/504 |

FOREIGN PATENT DOCUMENTS

| | | |
|---|---|---|
| CN | 1439102 A | 8/2003 |
| CN | 101266197 A | 9/2008 |
| CN | 101389517 A | 3/2009 |
| DE | 10001487 A1 | 8/2001 |
| DE | 102006012858 A1 | 9/2007 |
| DE | 102008050287 A1 | 4/2009 |
| DE | 102008032174 A1 | 7/2009 |
| DE | 102009051624 A1 | 2/2011 |
| EP | 0522849 A1 | 1/1993 |
| EP | 1143134 A1 | 10/2001 |
| GB | 1350276 A | 4/1974 |
| JP | 0847107 A | 2/1996 |
| JP | 09151779 A | 6/1997 |
| JP | 1062470 A | 3/1998 |
| JP | 2000352332 A | 12/2000 |
| JP | 2004251178 A | 9/2004 |
| JP | 2005061487 A | 3/2005 |
| JP | 2006254628 A | 9/2006 |
| JP | 2010074887 A | 4/2010 |
| WO | 9419670 A1 | 9/1994 |

OTHER PUBLICATIONS

Park et al., "Spectral Analysis of DC Link Ripple Currents in Three-Phase AC/DC/AC PWM Converters Feeding AC Machines", Conference of the IEEE Industrial Electronics Society, 2001.*

Kubota et al., "Compensation of pole Position Estimation Error for Sensor-Less IPMSM Drives with DC Link Current Detection", IEEE, PEDS, pp. 17-21, 2007.

Kobayashi et al., "Investigation of IPMSM's Position Estimation in Low Speed Region with DC Link Current Detection", IEEE, pp. 1411-1416, 2007.

Bodkhe et al., "A Variable-Speed, Sensorless, Induction Motor Drive Using DC Link Measurements", IEEE ICIEA, pp. 3591-3596, 2009.

PCT Invitation to Pay Additional Fees issued in connection with related Application No. PCT/US2012/053462 on Dec. 11, 2012.

PCT Invitation to Pay Additional Fees issued in connection with related Application No. PCT/US2012/053499 on Dec. 12, 2012.

PCT Invitation to Pay Additional Fees issued in connection with related Application No. PCT/US2012/053495 on Dec. 18, 2012.

PCT Search Report and Written Opinion issued in connection with related Application No. PCT/US2012/053499 on Jan. 23, 2013.

US Non-Final Office Action issued in connection with related US Appl. No. 13/234,411 on Feb. 11, 2013.

PCT Search Report and Written Opinion issued in connection with related Application No. PCT/US2012/053462 on Mar. 5, 2013.

PCT Search Report and Written Opinion issued in connection with related Application No. PCT/US2012/053495 on Mar. 5, 2013.

US Final Office Action issued in connection with related U.S. Appl. No. 13/234,411 on May 30, 2013.

US Non-Final Office Action issued in connection with related U.S. Appl. No. 13/234,380 on Jul. 2, 2013.

US Non-Final Office Action issued in connection with related U.S. Appl. No. 13/234,460 on Jul. 17, 2013.

US Notice of Allowance Office Action issued in connection with related U.S. Appl. No. 13/234,380 on Sep. 6, 2013.

US Notice of Allowance Office Action issued in connection with related U.S. Appl. No. 13/234,460 on Sep. 24, 2013.

US Non-Final Office Action issued in connection with related U.S. Appl. No. 13/234,881 on Mar. 3, 2015.

Unofficial English Translation of Chinese Office Action issued in connection with related CN Application No. 201280044835.6 on Aug. 27, 2015.

Unofficial English Translation of Chinese Office Action issued in connection with related CN Application No. 201280044851.5 on Sep. 6, 2015.

Unofficial English Translation of Chinese Office Action issued in connection with related CN Application No. 201280044849.8 on Sep. 22, 2015.

Australian Office Action issued in connection with related AU Application No. 2012308955 on Feb. 9, 2016.

(56) References Cited

OTHER PUBLICATIONS

Australian Office Action issued in connection with related AU Application No. 2012308951 on Feb. 26, 2016.
Unofficial English Translation of Chinese Office Action issued in connection with related CN Application No. 201280044851.5 on Apr. 27, 2016.
Australian Office Action issued in connection with related AU Application No. 2012308952 on May 10, 2016.
Unofficial English Translation of Japanese Office Action issued in connection with related JP Application No. 2014530692 on May 31, 2016.
Unofficial English Translation of Japanese Office Action issued in connection with related JP Application No. 2014530693 on Jun. 7, 2016.
U.S. Appl. No. 13/234,380, filed Sep. 16, 2011, Ajith Kumar et al.
U.S. Appl. No. 13/234,460, filed Sep. 16, 2011, Ajith Kumar et al.
U.S. Appl. No. 13/234,411, filed Sep. 16, 2011, Ajith Kumar et al.
U.S. Appl. No. 13/234,881, filed Sep. 16, 2011, Arijit Banerjee et al.

* cited by examiner

SYSTEMS AND METHODS FOR DIAGNOSING ENGINE COMPONENTS AND AUXILIARY EQUIPMENT ASSOCIATED WITH AN ENGINE

This U.S. Patent Application is a continuation-in-part (CIP) patent application of: Application No. PCT/US12/53473 filed on Aug. 31, 2012; and of Application No. PCT/US12/53499 filed on Aug. 31, 2012; and of Application No. PCT/US12/53495 filed on Aug. 31, 2012.

INCORPORATION BY REFERENCE

The following U.S. Patents are incorporated herein by reference in their entirety: U.S. Pat. No. 8,538,626 issued on Sep. 17, 2013; U.S. Pat. No. 8,626,371 issued on Jan. 7, 2014; and U.S. Pat. No. 8,626,372 issued on Jan. 7, 2014.

FIELD

Embodiments of the subject matter disclosed herein relate to systems and a methods for diagnosing an engine and associated auxiliary equipment.

BACKGROUND

Engine components and associated auxiliary equipment components may degrade during operation in various ways. For example, an engine cylinder in an engine may start mis-firing due to a worn out ignition plug. A radiator fan (auxiliary equipment) may start wobbling due to an unbalanced fan blade. The performance of a traction motor (auxiliary equipment) may degrade due to an open circuit in a motor coil winding.

One approach to detect engine degradation or auxiliary equipment degradation is to monitor engine speed. Diagnostic routines can monitor whether components of the engine speed rise above a threshold level, and generate diagnostic codes or other indications requesting service, de-rating engine power, shutting down the engine, derating auxiliary equipment power, or shutting down the auxiliary equipment.

However, the inventors herein have recognized that analysis of engine speed is often inadequate to thoroughly diagnose an engine problem or an auxiliary equipment problem. Furthermore, engine speed is often disassociated with certain types of auxiliary equipment (e.g., auxiliary equipment running off of a generator (alternator) connected to the engine such as a radiator fan or a traction motor.

BRIEF DESCRIPTION

In one embodiment, a system is disclosed. The system includes a controller that is operable to determine a condition of equipment electrically coupled to a generator based on frequency content of a measured dc-link parameter associated with the generator over time.

In one embodiment, a system is disclosed. The system includes a controller that is operable to determine a condition of equipment operatively coupled to a rotating shaft of a reciprocating engine based at least in part on a frequency content of a measured rotational speed of the shaft over time.

In one embodiment, a method is disclosed. The method includes measuring a dc-link parameter associated with a generator that is coupled to an engine during operation using a dc-link sensor, and diagnosing a condition of an engine component of the engine based on frequency content of the dc-link parameter using at least a processor.

In one embodiment, a method for auxiliary equipment electrically coupled to a generator that is operationally connected to a reciprocating engine is disclosed. The method includes measuring a dc-link parameter associated with the generator during operation, and diagnosing a condition of the auxiliary equipment based on frequency content of the dc-link parameter.

In one embodiment, a method for auxiliary equipment operationally connected to a rotating shaft of a reciprocating engine is disclosed. The method includes measuring a rotating shaft speed of the reciprocating engine during operation, and diagnosing a condition of the auxiliary equipment based on a frequency content of the shaft speed.

In one embodiment, a vehicle system is disclosed. The vehicle system includes a generator, auxiliary equipment electrically coupled to the generator, a dc-link sensor for measuring a dc-link parameter associated with the generator during operation, and a controller. The controller includes instructions configured to sample and transform the measured dc-link parameter, identify frequency content of the dc-link parameter, and diagnose a condition of the auxiliary equipment based on the frequency content of the dc-link parameter.

In one embodiment, a vehicle system is disclosed. The vehicle system includes a reciprocating engine having a rotating shaft, auxiliary equipment operatively coupled to the rotating shaft, a sensor for measuring a speed of the rotating shaft over time during operation, and a controller. The controller includes instructions configured to sample and transform the measured speed, identify frequency content of the speed, and diagnose a condition of the auxiliary equipment based on the frequency content of the speed.

In one embodiment, a test kit is disclosed. The test kit includes a controller that is operable to determine a condition of an auxiliary equipment electrically coupled to a generator based on frequency content of a measured dc-link parameter associated with the generator over time.

In one embodiment, a test kit is disclosed. The test kit includes a controller that is operable to determine a condition of an auxiliary equipment operatively coupled to a rotating shaft of a reciprocating engine based on frequency content of a measured speed of the shaft over time.

This brief description is provided to introduce a selection of concepts in a simplified form that are further described herein. This brief description is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The invention will be understood from reading the following description of non-limiting embodiments, with reference to the attached drawings, wherein below.

DETAILED DESCRIPTION

Embodiments of the subject matter disclosed herein relate to systems and a methods for diagnosing engine components of an engine and auxiliary equipment associated with an engine. Test kits for performing the methods are provided, also. The engine may be included in a vehicle, such as a locomotive system. Other suitable types of vehicles may include on-highway vehicles, off-highway vehicles, mining equipment, aircraft, and marine vessels. Other embodiments of the invention may be used for stationary engines such as wind turbines or power generators. The engine may be a diesel engine, or may combust another fuel or combination of fuels. Such alternative fuels may include gasoline, kerosene, biodiesel, natural gas, and ethanol—as well as combinations of the foregoing. Suitable engines may use compression ignition and/or spark ignition. These vehicles may include an engine with components that degrade with use.

Furthermore, embodiments of the subject matter disclosed herein use generator data, such as measured generator electrical parameters or generator data (e.g., a derived torque profile) derived from measured generator electrical parameters and/or engine parameters (e.g., speed), to diagnose conditions of engine components of an engine or auxiliary equipment and to distinguish between conditions and associated engine components and auxiliary equipment.

An engine may be put in a particular operating condition, state, or mode when looking for particular types of engine degradation. For example, the engine may be diagnosed during a self-loaded condition as part of a test procedure, a dynamic brake (db) setup condition, or a steady state motoring condition. Similarly, an auxiliary system may be put in a particular operating condition, state, or mode when looking for particular types of auxiliary equipment degradation. The diagnostic and prognostic methods discussed herein can be used for trending, comparing cylinder-to-cylinder variation, performing test procedures, repair confirmation, and aid in repair. Alternatively, generator and/or engine data may be sampled and analyzed when the engine reaches a particular operating condition or state during normal operation.

Figure 1:
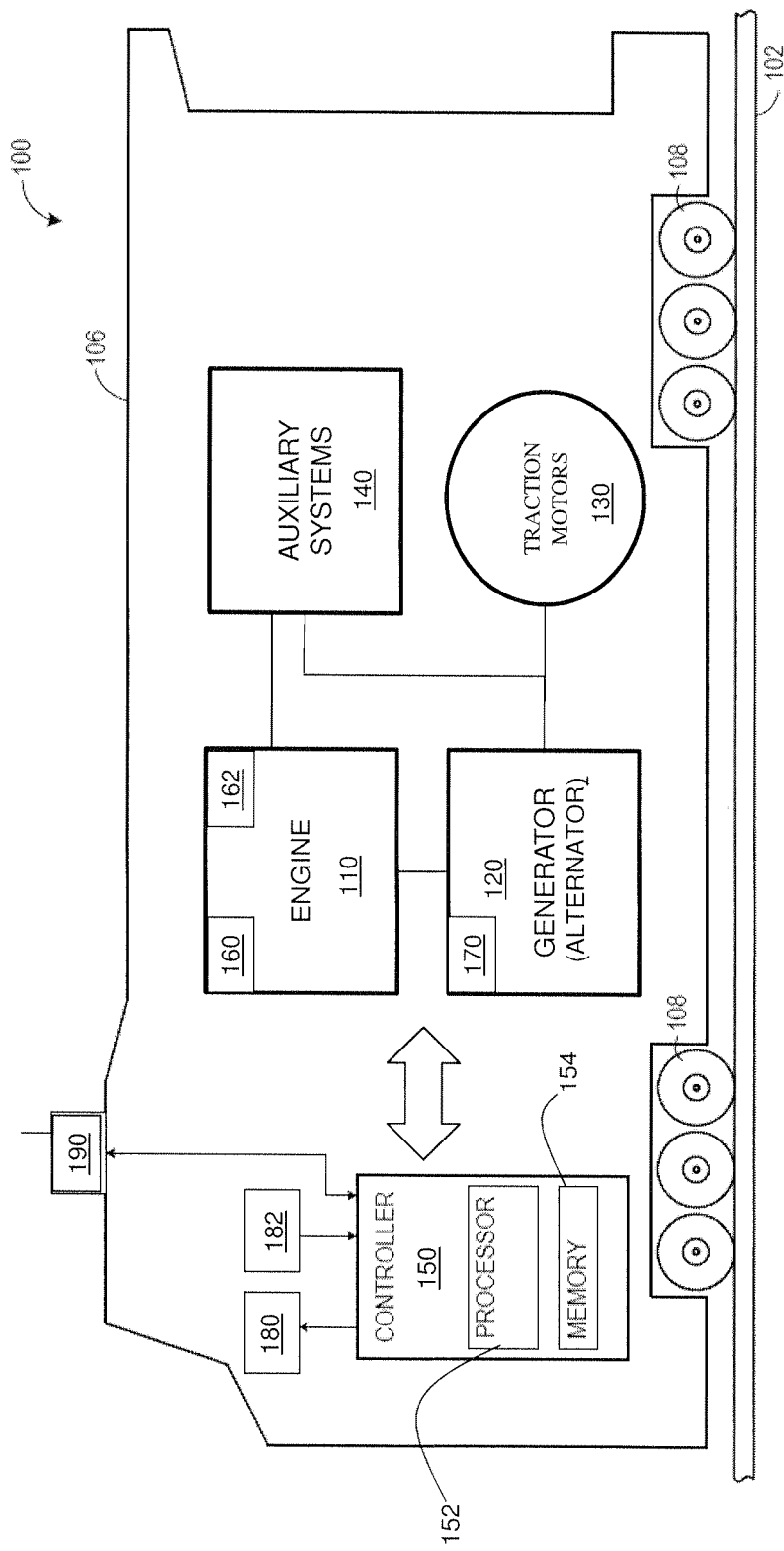
FIG. 1 is an illustration of an example embodiment of a vehicle system (e.g., a locomotive system), having an engine and a generator (alternator), herein depicted as a rail vehicle configured to run on a rail via a plurality of wheels.

FIG. 1 is an illustration of an example embodiment of a vehicle system 100 (e.g., a locomotive system) herein depicted as a rail vehicle 106 configured to run on a rail 102 via a plurality of wheels 108. As depicted, the rail vehicle 106 includes an engine 110 operatively connected to a generator (alternator) 120. The vehicle 106 also includes traction motors 130 operatively connected to the generator 120 for driving the wheels 108. The vehicle 106 further includes various auxiliary systems or equipment 140 operatively connected to the generator 120 or the engine 110 (e.g., the rotatable engine shaft 111, see FIG. 2) for performing various functions. Even though labeled separately in FIG. 1, the traction motors 130 are considered to be a type of auxiliary equipment herein.

The vehicle 106 further includes a controller 150 to control various components related to the vehicle system 100. In one example, controller 150 includes a computer control system. In one embodiment, the computer control system is largely software based and includes a processor, such as processor 152, configured to execute computer operable instructions. The controller 150 may include multiple engine control units (ECU) and the control system may be distributed among each of the ECUs. The controller 150 further includes computer readable storage media, such as memory 154, including instructions (e.g., computer executable instructions) for enabling on-board monitoring and control of rail vehicle operation. Memory 154 may include volatile and non-volatile memory storage. In accordance with another embodiment, the controller may be hardware based using, for example, digital signal processors (DSPs) or other hardware logic circuitry to perform the various functions described herein.

The controller may oversee control and management of the vehicle system 100. The controller may receive a signal from a speed sensor 160 of the engine or from various generator sensors 170 to determine operating parameters and operating conditions, and correspondingly adjust various engine actuators 162 to control operation of the rail vehicle 106. In accordance with an embodiment, the speed sensor includes a multi-tooth pick-up wheel connected to the engine shaft 111, and a reluctance sensor for sensing when a tooth of the pick-up wheel passes by the reluctance sensor. For example, the controller may receive signals representing various generator parameters from various generator sensors. The generator parameters can include a dc-link voltage, a dc-link current, a generator field voltage, a generator field current, a generator output voltage, and a generator output current. Other generator parameters may be possible as well, in accordance with various embodiments. Correspondingly, the controller may control the vehicle system by sending commands to various components such as traction motors, alternator, cylinder valves, throttle, etc. Signals from generator sensors 170 may be bundled together into one or more wiring harnesses to reduce space in vehicle system 100 devoted to wiring and to protect the signal wires from abrasion and vibration.

The controller may include onboard electronic diagnostics for recording operational characteristics of the engine. Operational characteristics may include measurements from sensors 160 and 170, for example. In one embodiment, the operational characteristics may be stored in a database in memory 154. In one embodiment, current operational characteristics may be compared to past operational characteristics to determine trends of engine and/or auxiliary equipment performance.

The controller may include onboard electronic diagnostics for identifying and recording potential degradation and failures of components of vehicle system 100. For example, when a potentially degraded component is identified, a diagnostic code may be stored in memory 154. In one embodiment, a unique diagnostic code may correspond to each type of degradation that may be identified by the controller. For example, a first diagnostic code may indicate a problem with cylinder 1 of the engine, a second diagnostic code may indicate a problem with cylinder 2 of the engine, a third diagnostic code may indicate a problem with one of the auxiliary systems, etc.

The controller may be further linked to display 180, such as a diagnostic interface display, providing a user interface to the locomotive operating crew and a maintenance crew. The controller may control the engine, in response to operator input via user input controls 182, by sending a command to correspondingly adjust various engine actuators 162. Non-limiting examples of user input controls 182 may include a throttle control, a braking control, a keyboard, and a power switch. Further, operational characteristics of the engine and auxiliary equipment, such as diagnostic codes corresponding to degraded components, may be reported via display 180 to the operator and/or the maintenance crew.

The vehicle system may include a communications system 190 linked to the controller. In one embodiment, communications system 190 may include a radio and an antenna for transmitting and receiving voice and data messages. For example, data communications may be between vehicle system and a control center of a railroad, another locomotive, a satellite, and/or a wayside device, such as a railroad switch. For example, the controller may estimate geographic coordinates of vehicle system using signals from a GPS receiver. As another example, the controller may transmit operational characteristics of the engine and/or auxiliary equipment to the control center via a message transmitted from communications system 190. In one embodiment, a message may be transmitted to the command center by communications system 190 when a degraded component of the engine or auxiliary equipment is detected and the vehicle system may be scheduled for maintenance.

Figure 2:
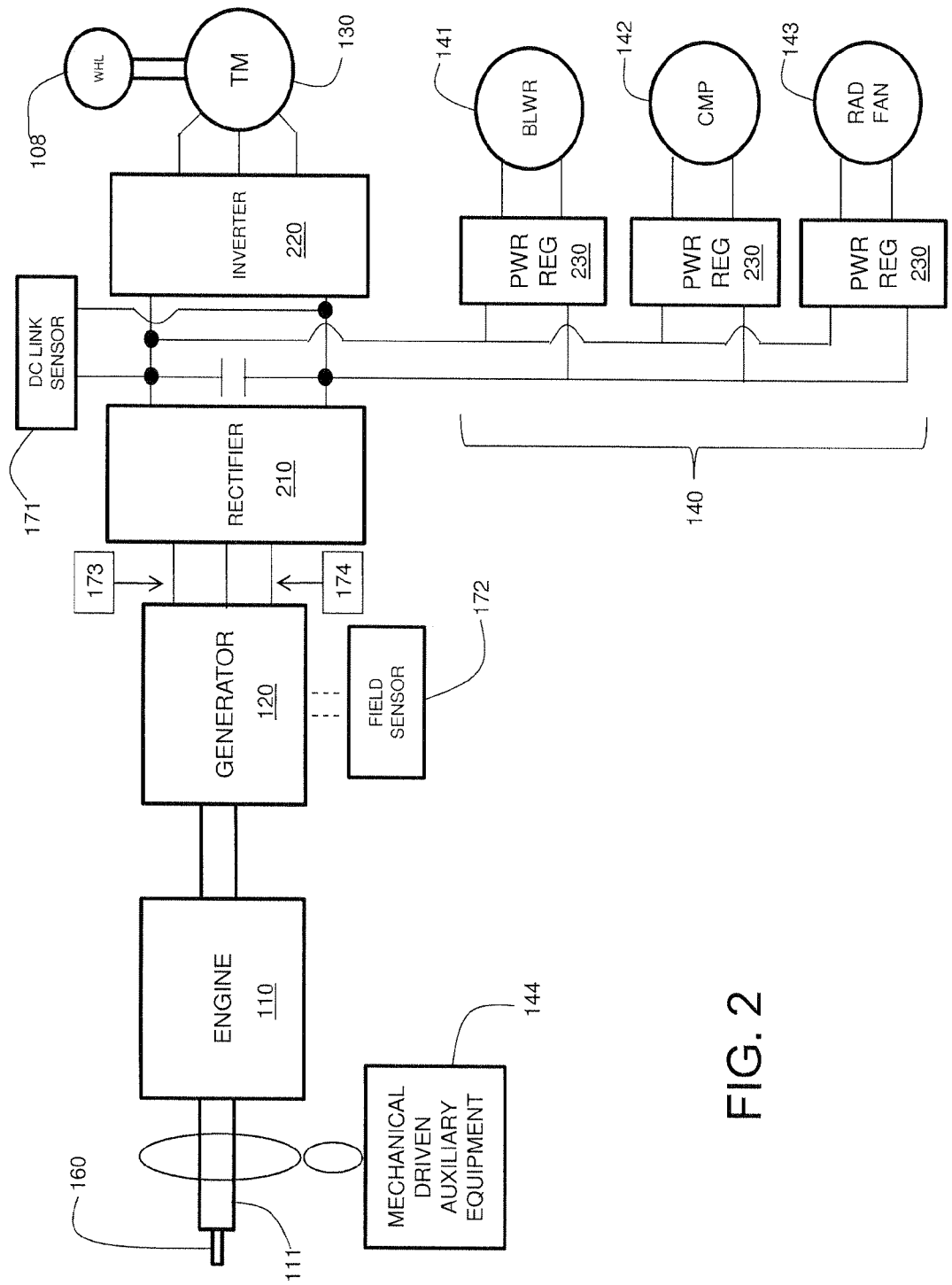
FIG. 2 is an illustration of an example embodiment of the engine and generator of FIG. 1 operatively connected to various auxiliary equipment 140 and traction motors.

FIG. 2 is an illustration of an example embodiment of the engine 110 and generator 120 of FIG. 1 operatively connected to various auxiliary equipment 140 (141, 142, 143, 144) and traction motors 130. Various mechanical auxiliary equipment 144 may be operatively coupled to and driven by the rotating engine shaft 111. Other auxiliary equipment 140 are driven by the generator 120 through a rectifier 210 that produces a dc-link voltage to power regulators 230. Examples of such auxiliary equipment include a blower 141, a compressor 142, and a radiator fan 143. The traction motors 130 are driven by the generator 120 through the rectifier 210 that produces a dc-link voltage to an inverter 220. Such auxiliary equipment 140, traction motors 130, and their implementations are well known in the art. In accordance with certain embodiments, the generator 120 may actually be one or more generators such as, for example, a main generator to drive the traction motors 130 and an auxiliary generator to drive a portion of the auxiliary equipment 140. Further examples of auxiliary equipment include turbochargers, pumps, engine cooling systems, braking grids, and energy storage systems.

The speed sensor 160 measures the speed of the rotating shaft 111 of the engine during operation. The dc-link sensor 171 is a generator sensor and can measure dc-link voltage, dc-link current, or both, in accordance with various embodiments. The field sensor 172 is a generator sensor and can measure field current of the generator, field voltage of the generator, or both, in accordance with various embodiments. In accordance with certain embodiments, generator sensors 173 and 174 are provided for measuring the armature output voltage and current of the generator, respectively. Suitable commercially available sensors may be selected based on application specific parameters.

Referring again to FIG. 2, the AC output of the generator 120 is rectified by the diode rectifier 210 to form a dc-link voltage that is supplied to various auxiliary systems or equipment over a dc bus. The dc-link voltage drives some auxiliary equipment (e.g., blower 141, compressor 142, and radiator fan 143) through power regulators 230. The dc-link voltage drives the traction motors 130 through an inverter 220.

Figure 3:
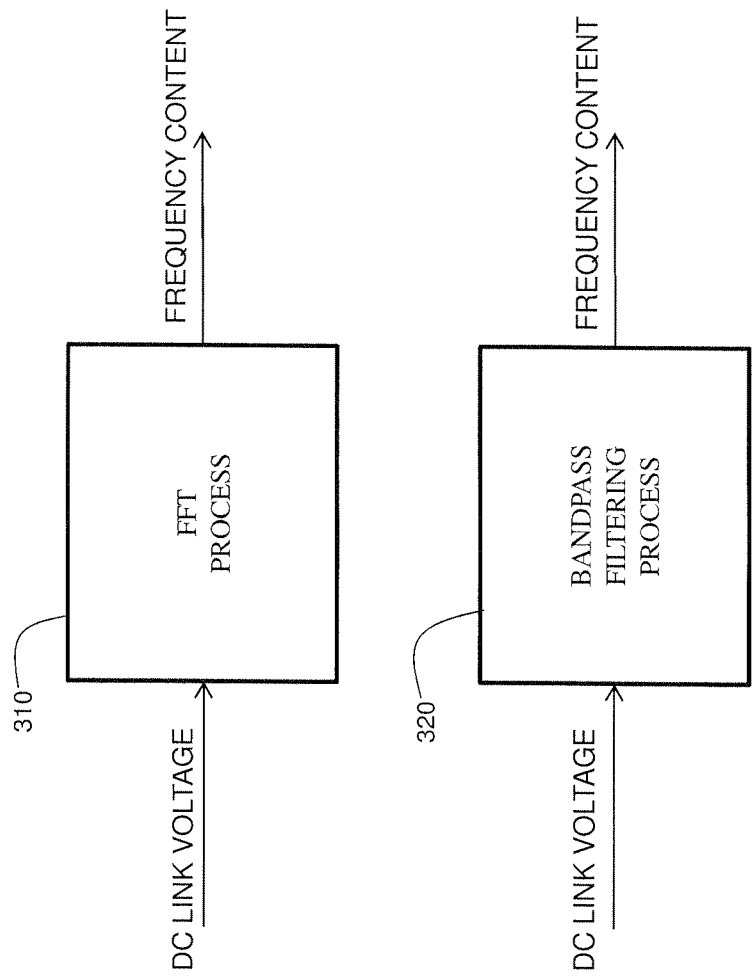
FIG. 3 is an illustration of example embodiments of how to generate frequency content from a time sampled dc-link parameter.

In accordance with an embodiment, the dc-link voltage is measured by the dc-link sensor 171 and is analyzed by the controller 150 to diagnose a condition of the engine or auxiliary equipment based on frequency content of the dc-link voltage. A Fourier transform process 310 or a bandpass filtering process 320 can be used to determine the frequency content of the dc-link voltage as shown in FIG. 3. For auxiliary systems that operate intermittently, time-frequency analysis techniques such as short time Fourier transformation or wavelet transformation may be used. As an alternative, the dc-link current can be measured and used instead of the dc-link voltage. The controller 150 is configured to analyze one or more components of the frequency content, isolate to a particular engine component or auxiliary system, and diagnose the condition of the particular engine component or auxiliary system (e.g., down to a particular component of the auxiliary system). In accordance with an embodiment, the engine 110 may first be driven to a specified operating condition, state, or mode before diagnosing the engine or auxiliary equipment.

The controller 150 samples the dc-link parameter over time and performs a frequency analysis process on the dc-link parameter data. In accordance with one embodiment, the frequency analysis process is a Fourier transform process 310 (e.g., a Fast Fourier Transform, FFT, process). In accordance with another embodiment, the frequency analysis process is a bandpass filtering process 320. The frequency analysis process transforms the sampled time domain dc-link parameter into frequency content in the frequency domain. The various frequency components of the frequency content can include dc (zero order), fundamental (first order) and harmonic (second order, half order, third order, etc.) frequency components. The fundamental frequencies for each of the connected auxiliary systems could be different, depending on the speed/mode of operation of the engine or auxiliary systems. In accordance with an embodiment, the Fourier Transform process and the bandpass filtering process include computer executable instructions that are executed by the processor 152. The frequency transformation can be performed on processed/derived signals such as, for example, kilovolt-amps (kVA) or kilowatts (kW) which are the product of current and voltage, or torque which is kW/frequency of the signal.

The engine may have a plurality of cylinders that fire in a predefined sequence, where each cylinder fires once during a four stroke or a two stroke cycle. For example, a four cylinder, four stroke engine may have a firing sequence of 1-3-4-2, where each cylinder fires once for every two revolutions of the engine. Thus, the firing frequency of a given cylinder is one half the frequency of revolution of the engine and the firing frequency of any cylinder is twice the frequency of revolution of the engine. The frequency of revolution of the engine may be described as the first engine order. Such a first order frequency component can show up in the frequency content of the measured generator parameter. The firing frequency of a given cylinder of a four stroke engine may be described as the half engine order, where the half engine order is one half the frequency of revolution of the engine. Such a half order frequency component can also show up in the frequency content of the measured dc-link parameter. Similarly, various auxiliary systems (fans, pumps, compressors, traction motors, etc.) may have cyclical components that also can produce frequency components that appear in the dc-link parameter.

As another example of a four stroke engine, a twelve cylinder engine may have a firing sequence of 1-7-5-11-3-9-6-12-2-8-4-10, where each cylinder fires once for every two revolutions of the engine. Thus, the firing frequency of a given cylinder is one half the frequency of revolution of the engine and the firing frequency of any cylinder is six times the frequency of revolution of the engine. As an example of a two stroke engine, a twelve cylinder engine may have a firing sequence of 1-7-5-11-3-9-6-12-2-8-4-10, where each cylinder fires once for every revolution of the engine. Thus, the firing frequency of a given cylinder is the frequency of revolution of the engine and the firing frequency of any cylinder is twelve times the frequency of revolution of the engine. Again, these frequency components can show up in the frequency content of the measured dc-link parameter.

For example, the engine may be a four stroke engine operating at 1050 RPM. Thus, the first engine order is at 17.5 Hz and the half engine order is at 8.75 Hz. The dc-link voltage may vary with a periodic frequency as the engine shaft 111 rotates during operation. For example, the frequency content of the dc-link voltage may include a frequency component at the frequency of the first engine order. In other words, the peak magnitude of the frequency content may occur at the first-order frequency component. The dc-link voltage may also include frequency content at other harmonics of the first-order frequency, such as at a second-order frequency (twice the engine frequency), a third-order frequency (three times the engine frequency), etc. Similarly, the dc-link voltage may include frequency content at frequencies less than the first-order frequency, such as at a half-order frequency (half the engine frequency).

For an engine or auxiliary system that is "healthy" and is operating properly, the frequency content of the measured dc-link parameter can have a particular healthy signature. Deviations from such a healthy signature can indicate a problem with the engine or auxiliary system. For example, in accordance with an embodiment, a condition of an auxiliary system may be diagnosed by analyzing a half order magnitude and/or phase of the frequency content.

Figure 4:
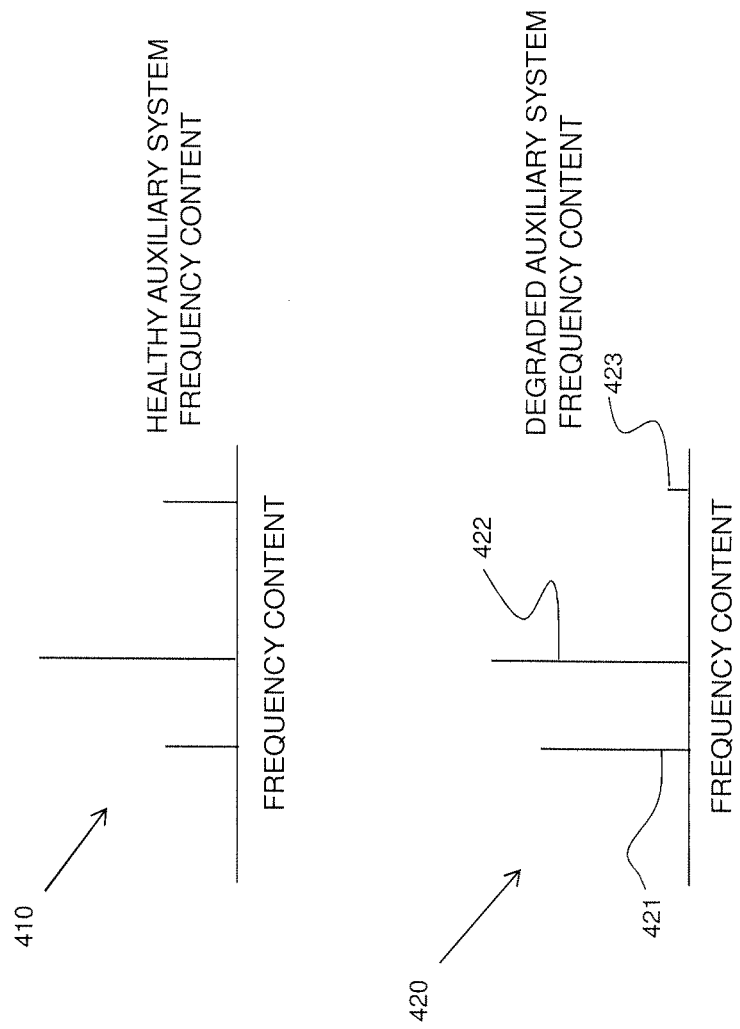
FIG. 4 is an illustration showing example embodiments of "healthy" and "unhealthy" frequency content.

FIG. 4 is an illustration showing example embodiments of "healthy" and "unhealthy" frequency content. The frequency content 410 of the healthy auxiliary system (i.e., an auxiliary system that is operating properly) has three frequency components of absolute and relative magnitudes as shown in FIG. 4, in accordance with an embodiment. The frequency content 420 of the unhealthy engine (i.e., an auxiliary system that is not operating properly due to some degradation or failure) has three frequency components at the same locations as in the frequency content 410 for the healthy engine. However, the amplitude of one frequency component 421 (e.g., a half order component) is distorted (e.g., increased in amplitude), and the amplitude of another frequency component 423 (e.g., a second order component) is also distorted (e.g., decreased in amplitude), in accordance with an embodiment. The distorted frequency components 421 and 423 in the frequency content 420 are indicative of an unhealthy auxiliary system. Furthermore, the particular characteristics of the distorted frequency components (e.g., amplitude) relative to the other frequency components in the frequency content 420 of the unhealthy auxiliary system can be indicative of a particular type of degradation or failure.

Also, the phase of the half order component, with respect to a reference component of the auxiliary system, may be used to isolate a problem to a particular component of the auxiliary system.

The degraded components may cause the auxiliary system to operate less efficiently. Further, the condition of the degraded components may accelerate degradation of the components which may increase the likelihood of catastrophic auxiliary system failure and road failure. The diagnosis may include both a warning of degradation as well as an indication of the type and/or location of the degraded auxiliary system component.

Figure 5:
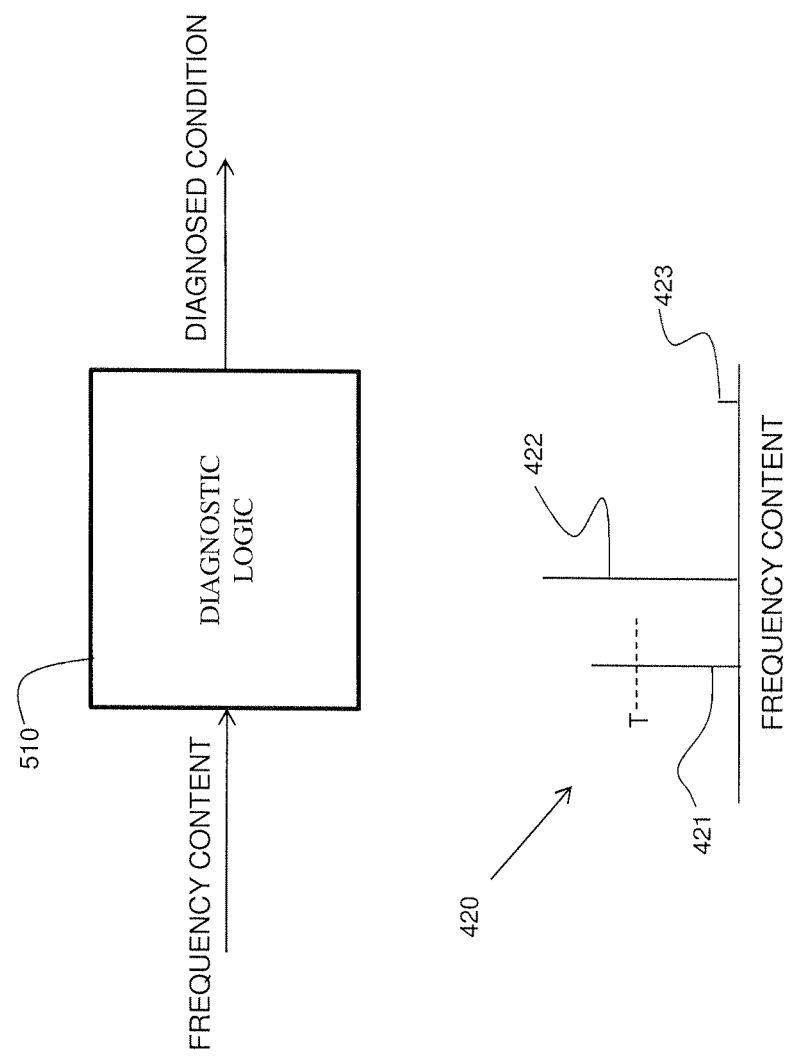
FIG. 5 is an illustration of an example embodiment of how a diagnostic logic in the controller can detect an unhealthy condition in the frequency content of a dc-link parameter.

FIG. 5 is an illustration of an embodiment of how a diagnostic logic 510 in the controller 150 can detect an unhealthy condition in the frequency content of a dc-link parameter. For example, the half order component 421 can be compared to a threshold level T by the diagnostic logic 510. If the magnitude of the component 421 exceeds the threshold level T, then the diagnostic logic 510 determines that degradation in an auxiliary system has occurred. Furthermore, if the diagnostic logic 510 determines that the ratio of the half order component to the first order component 422 exceeds a second threshold level, and the ratio of the first order component to the second order component 423 exceeds a third threshold level, then the diagnostic logic 510 isolates the degradation to a particular auxiliary system component. In accordance with an embodiment, the diagnostic logic includes computer executable instructions that are executed by the processor 152. In accordance with an embodiment, the ratio of a half order component to a dc or zero order component can be indicative of an engine or auxiliary equipment problem. Furthermore, the threshold level T can be dependent on an operating condition of the engine or auxiliary equipment such as, for example, power, speed, ambient conditions, repair history, etc.

Types of auxiliary system degradation or failures that can be diagnosed, distinguished, and isolated may include an unbalanced radiator fan, a faulty compressor, and a degraded traction motor, for example. Once a degradation or failure is diagnosed, an action can be taken. Such actions may include, for example, providing a warning signal to the operator (e.g., via the display 180), adjusting an auxiliary system operating parameter (e.g., derating the auxiliary system power, shutting down a portion of the auxiliary system, shutting down the auxiliary system entirely), logging a maintenance action, and transmitting the diagnosed condition to a central location (e.g., via the communications system 190).

Figure 6:
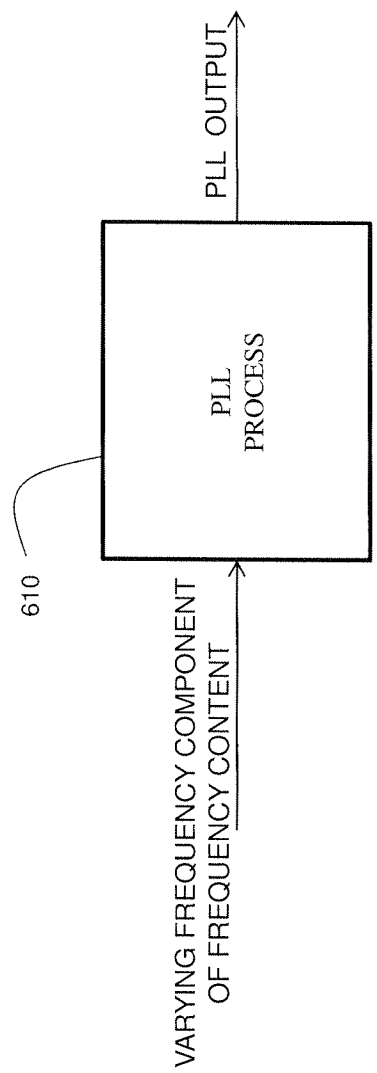
FIG. 6 is an illustration of an example embodiment of how to isolate a degradation to a particular auxiliary system.

FIG. 6 is an illustration of an example embodiment of how to isolate a degradation to a particular auxiliary system. A particular frequency component of the frequency content out of the FFT process or the bandpass filtering process is tracked (in frequency) by a phase-locked loop (PLL) process 610 of the controller 150. A frequency component can move around due to a change in an operating condition (e.g., compressor speed, radiator fan speed, engine speed, etc.) In accordance with an embodiment, the operating condition, state, or mode (e.g., speed) of a particular auxiliary system (e.g., the radiator fan 143) can be varied by the controller 150. If the particular frequency component varies (as tracked by the PLL process) in correspondence with the varying operating condition, state, or mode of the particular auxiliary system, then that particular frequency component is correlated to that particular auxiliary system. The amplitude and/or phase of the tracked frequency component out of the PLL process can be compared to one or more thresholds to diagnose the particular problem (e.g., particular degraded component) within the isolated auxiliary system.

In accordance with an embodiment, a plurality of frequency components of the frequency content of the dc-link voltage (or dc-link current) are tracked continuously and correlated to particular engine components or auxiliary equipment. If a particular frequency component does not correlate to a particular engine component or auxiliary system, then a condition, state, or operating condition of the engine 110 (e.g., speed) can be varied to determine if the particular frequency component correlates to the engine. In this manner, distinctions can be made between engine degradation and auxiliary equipment degradation. In accordance with an embodiment, the various auxiliary systems provide feedback to the controller 150 (via sensor indicators) such that the controller is aware of which condition of which auxiliary system is varying.

As a result, if a particular frequency component suddenly appears in the frequency content of the dc-link voltage, the techniques described herein can be employed to isolate the frequency component to the engine or to auxiliary equipment. If the engine is ruled out, then the techniques described herein can further be employed to isolate to a particular auxiliary system, and ultimately to a particular problem with a particular auxiliary system. For example, a 12 Hz frequency component that suddenly appears in the frequency content of the dc-link voltage is ruled out as corresponding to the engine by varying the engine speed. Operating states of the radiator fan 143, the compressor 142, the blower 141, and the traction motor 130 are successively varied by the controller 150 until, finally, the 12 Hz component is isolated to the traction motor 130. The amplitude of the 12 Hz component is then compared to several thresholds and it is determined that a catastrophic failure of the traction motor 130 is likely to occur soon. As a result, the traction motor 130 is shut down.

Referring again to FIG. 2, various mechanically driven auxiliary equipment 144 can be operatively coupled to the rotating shaft 111 of the engine 110. Examples of such mechanically driven equipment may include pumps and engine cooling systems. In accordance with an embodiment, the rotating shaft speed of the engine 110 is measured (e.g., via the speed sensor 160) and the controller 150 diagnoses a condition of the engine or auxiliary equipment based on frequency content of the shaft speed.

Again, a Fourier transform process 310 or a bandpass filtering process 320 can be used to determine the frequency content of the shaft speed. For auxiliary systems that operate intermittently, time-frequency analysis techniques such as short time Fourier transform or wavelet transform may be used. The controller 150 is configured to analyze one or more components of the frequency content, isolate to a particular engine component or auxiliary system coupled to the rotating shaft 111, and diagnose the condition of the particular engine component or auxiliary system. In accordance with an embodiment, the engine 110, or any of the auxiliary equipment, may first be driven to a specified operating condition, state, or mode before diagnosing the auxiliary equipment. For example, if a frequency generated by the engine is the same as or very close to a frequency produced by the auxiliary equipment during the diagnosis, then the mode/frequency of operation of the engine, auxiliary equipment, or both can be changed to provide a frequency separation. This separation can be performed during the time of diagnosis.

Again, FIG. 6 is an illustration of an example embodiment of how to isolate a degradation to a particular engine component or auxiliary system. A particular frequency component of the frequency content out of the FFT process or the bandpass filtering process is tracked (in frequency) by a phase-locked loop (PLL) process 610 of the controller 150. In accordance with an embodiment, the operating condition, state, or mode (e.g., pressure) of a particular engine component or auxiliary system (e.g., a pump) can be varied by the controller 150. If the particular frequency component varies (as tracked by the PLL process) in correspondence with the varying operating condition, state, or mode of the particular engine component or auxiliary system, then that particular frequency component is correlated to that particular engine component or auxiliary system. The amplitude and/or phase of the tracked frequency component can be compared to one or more thresholds to diagnose the particular problem with the isolated engine component or auxiliary system.

In accordance with an embodiment, a plurality of frequency components of the frequency content of the shaft speed are continuously tracked and correlated to particular engine components or auxiliary equipment coupled to the shaft 111. In accordance with an embodiment, the engine and various auxiliary systems provide feedback to the controller 150 such that the controller is aware of which condition of which auxiliary system is varying. As a result, if a particular frequency component suddenly appears in the frequency content of the speed signal, the techniques described herein can be employed to isolate the frequency component to the engine component or auxiliary equipment and, ultimately, to a particular problem with a particular engine component or auxiliary system.

In accordance with an embodiment, the controller 150 is operable to report a degraded engine component or auxiliary equipment condition, for example, via the display 180 and the communication system 190. Furthermore, in accordance with an embodiment, the controller 150 includes instructions configured to adjust an engine or auxiliary equipment operating parameter (e.g., fan speed) based on the diagnosed condition.

An embodiment includes a test kit having a controller that is operable to determine a condition of an engine component or auxiliary equipment electrically coupled to a generator based on frequency content of a measured dc-link parameter associated with the generator over time. The test kit may further include a sensor to sense the dc-link parameter (e.g., voltage or current) associated with the generator. The controller is further operable to communicate with the sensor to sample the dc-link parameter over time and to extract the frequency content of the dc-link parameter.

Another embodiment includes a test kit having a controller that is operable to determine a condition of an engine component or auxiliary equipment operatively coupled to a rotating shaft of a reciprocating engine based on frequency content of a measured speed of the shaft over time. The test kit may further include a sensor to sense the speed of the shaft. The controller is further operable to communicate with the speed sensor to sample the speed over time and to extract frequency content of the speed.

Figure 7:
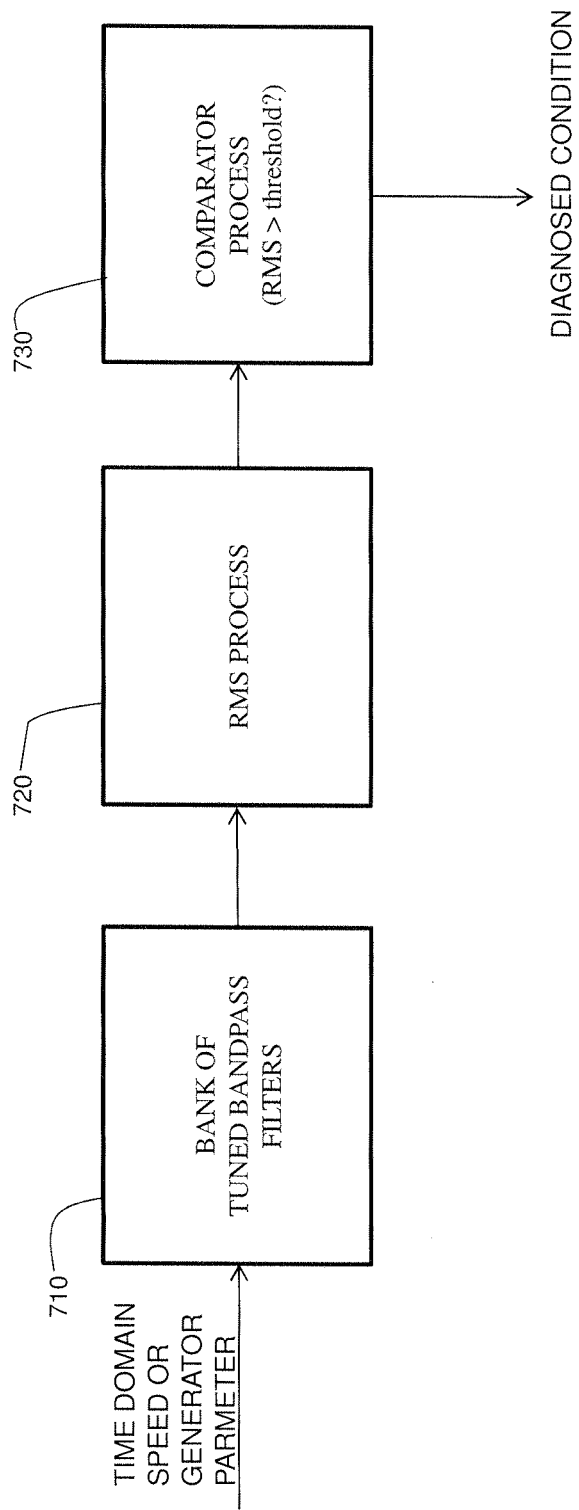
FIG. 7 is an illustration of an example embodiment of how to diagnose a condition of auxiliary equipment using a bank of tuned bandpass filters.

As an alternative, instead of employing a PLL process, the dc-link voltage (or dc-link current) or the speed signal can be processed by a bank of bandpass filters in the controller 150, each tuned to a particular frequency corresponding to operation under particular conditions. Root-mean-square (RMS) values of the filtered signals (or some other combination, e.g., average, of the filtered signals) provide an indication of the health of the engine or auxiliary components (e.g., by comparing the RMS values to determined threshold values). FIG. 7 is an illustration of an example embodiment of how to diagnose a condition of an engine component or auxiliary equipment using a bank of tuned bandpass filters 710 along with a RMS process 720 and a comparator process 730 provided by the controller (e.g., in the form of computer executable instructions, for example).

Again, instead of employing a PLL process, the dc-link voltage or the speed signal can be processed by the FFT process or the bandpass filtering process and patterns in the frequency content can be analyzed by the controller to determine failure modes or degradation of the engine or auxiliary equipment. Various harmonics in the frequency content can be correlated to particular engine components or auxiliary equipment by knowing in advance the fundamental frequency of operation of the particular systems. For example, a 12 Hz sub-harmonic frequency may be correlated to an auxiliary system operating at a fundamental frequency of 24 Hz.

Both the frequency content of the speed signal and the frequency content of the dc-link voltage (or dc-link current) can be used to diagnose a condition of the engine or auxiliary equipment. The various techniques described herein may be combined in particular ways, using both speed and dc-link signals, to distinguish from the engine, isolate to a particular auxiliary system, and further isolate to a particular component of the auxiliary system.

Further examples of applications of systems and methods described herein are now provided. The examples illustrate various approaches for diagnosing and distinguishing between different types of engine or auxiliary system degradation based on the frequency content of dc-link data and/or engine speed data.

In one embodiment, a degraded engine component or auxiliary system may be detected based on a frequency content signature, such as the magnitude of the half-order frequency component being greater than a half-order threshold value. In an alternate embodiment, the magnitudes of the frequency content may be integrated over the range of frequencies, and a degraded component of an engine component or an auxiliary system may be detected based on the integration being greater than an integral threshold value.

Detection of one degraded component, where the other components of the engine or auxiliary system are more healthy (or less degraded), may have a more clear frequency content signature than when multiple components of the engine or auxiliary system are degraded. For example, the frequency content signature of one degraded component may be identified by comparing the magnitude of the half-order frequency component to a half-order magnitude threshold value. However, multiple degraded components may have a different frequency component signature than a single degraded component. Further, the position in the operating sequence order of multiple degraded components may change the frequency content signature. For example, two degraded components 180° out of phase may have a different frequency component signature than two degraded components in successive operating sequence order, and thus the methods disclosed herein may identify one or more degraded components based on various changes in the frequency content signature. Further, it may be beneficial to generate a frequency content signature of a healthy engine component or auxiliary system by recording frequency content at various frequencies and operating conditions. In one embodiment, the frequency content of an engine component or an auxiliary system may be compared to the frequency content signature of a healthy engine component or auxiliary system. Anomalies not matching the frequency content signature of the healthy engine component or auxiliary system or a different degraded engine component or auxiliary system component may be identified and reported by the controller, for example.

In one embodiment, the time-domain dc-link data may be filtered by a low-pass filter with a cut-off frequency slightly greater than the first-order frequency. For example, the cut-off frequency may be ten to twenty percent greater than the first order frequency. Thus, in one embodiment, the cutoff frequency may be determined by the engine speed. The dc-link data may be sampled in time at a frequency greater than or equal to the Nyquist rate. In one embodiment, the time-domain signal may be sampled at a frequency greater than twice the first engine order frequency (or first auxiliary system order frequency). In one embodiment, the time-domain signal may be sampled at a frequency greater than twice the engine red-line frequency. Thus, by low-pass filtering and sampling at a frequency greater than or equal to the Nyquist rate, the frequency content of the dc-link data may not be aliased. The same may apply for speed data of the engine.

As discussed herein, the sampled dc-link data (e.g., dc-link voltage, dc-link current) and/or engine speed data may be transformed to generate a frequency domain frequency content. In one embodiment, a fast Fourier transform may be used to generate the frequency domain frequency content. In one embodiment, a correlation algorithm may be applied to compare the frequency content of the dc-link data and/or engine speed data, to a signature for a condition of an engine component or an auxiliary system. For example, the signature for a healthy auxiliary system may include frequency content at the first-order frequency with a magnitude below a first-order threshold value and frequency content at the half-order frequency with a magnitude below a half-order threshold value. The first-order threshold value may correspond to an operational state of the auxiliary system.

For example, the historical engine or auxiliary system data may be stored in a database including samples of frequency content from earlier operation of the engine or auxiliary system. Thus, a trend in frequency content may be detected and the trend may be used to determine the health of the engine or auxiliary system. For example, an increasing magnitude at the half order component for a given radiator fan speed and load may indicate that a radiator fan is degrading.

In one embodiment, frequency content of the dc-link data and/or engine speed data may be stored in a database including historical auxiliary equipment data. For example, the database may be stored in memory 154 of controller 150. As another example, the database may be stored at a site remote from rail vehicle 106. For example, historical data may be encapsulated in a message and transmitted with communications system 190. In this manner, a command center may monitor the health of the engine or auxiliary equipment in real-time. For example, the command center may perform steps to diagnose the condition of the engine or auxiliary equipment using the dc-link data and/or engine speed data transmitted with communications system 190. For example, the command center may receive dc-link voltage data from rail vehicle 106, frequency transform the dc-link voltage data, apply a correlation algorithm to the transformed data, and diagnose potential degradation of an engine component or an auxiliary system. Further, the command center may schedule maintenance and deploy healthy locomotives and maintenance crews in a manner to optimize capital investment. Historical data may be further used to evaluate the health of the engine or auxiliary equipment before and after equipment service, equipment modifications, and equipment component change-outs.

In one embodiment, a potential fault may be reported to the locomotive operating crew via display 180. Once notified, the operator may adjust operation of rail vehicle 106 to reduce the potential of further degradation of the engine or auxiliary equipment. In one embodiment, a message indicating a potential fault may be transmitted with communications system 190 to a command center. Further, the severity of the potential fault may be reported. For example, diagnosing a fault based on frequency content of dc-link data and/or engine speed data may allow a fault to be detected earlier than when the fault is diagnosed with only average engine or auxiliary system information. Thus, the engine or auxiliary system may continue to operate when a potential fault is diagnosed in the early stages of degradation. In contrast, it may be desirable to stop the engine component or auxiliary system or schedule prompt maintenance if a potential fault is diagnosed as severe. In one embodiment, the severity of a potential fault may be determined according to a difference between a threshold value and the magnitude of one or more components of the frequency content of the dc-link and/or speed data.

By analyzing the frequency content of dc-link data and/or engine speed data, it may be possible to monitor and diagnose the engine or auxiliary equipment during operation. Further, operation of an engine or auxiliary system with a degraded component may be adjusted to potentially reduce additional degradation of the component and to potentially reduce the likelihood of additional engine or auxiliary system failure and in-use failure. For example, the half-order component may be compared to a half-order threshold value. In one embodiment, if the magnitude of the half-order component is greater than the half-order threshold value, the potential fault may be a degraded a first degraded component. However, if the magnitude of the half-order component is not greater than the half-order threshold value, the potential fault may be a second degraded component.

In one embodiment, the potential fault may be reported to the locomotive operating crew via display 180 and the operator may adjust operation of rail vehicle 106 to reduce the potential of further degradation. In one embodiment, a message diagnosing the potential fault may be transmitted with communications system 190 to a command center.

In one example, the half-order frequency component of the dc-link and/or speed data may be monitored for each disabled component of an engine or auxiliary system. The component may be degraded when the half-order frequency component drops below a half-order threshold value while the component is disabled. The component may be a healthy component when the half-order frequency component remains above the half-order threshold value while the component is disabled. In other words, the degraded component may be the component that contributes a higher amount of frequency content at the half-order frequency component than other engine or auxiliary system components. In one embodiment, the selective disabling diagnosis may be performed when the engine or auxiliary system is operating at idle or lightly loaded.

It may be more desirable to switch off an engine component or auxiliary system than to have a degraded component fail in a manner that may cause additional damage to the engine or auxiliary system. In one embodiment, a threshold value may be determined that indicates continued operation of the engine or auxiliary system may be undesirable because the potential fault is severe. For example, the potential fault may be judged as severe if a magnitude of the half-order frequency component exceeds a threshold value. The engine or auxiliary system may be stopped if the severity of the potential fault exceeds the threshold value.

A request to schedule service may be sent, such as by a message sent via communications system 190, for example. Further, by sending the potential fault condition and the severity of the potential fault, down-time of rail vehicle 106 may be reduced. For example, service may be deferred on rail vehicle 106 when the potential fault is of low severity. Down-time may be further reduced by derating power of the engine or auxiliary system, such as by adjusting an engine or auxiliary system operating parameter based on the diagnosed condition. It may be determined if derating of the engine or auxiliary system is enabled. For example, derating the power of the engine or auxiliary system may reduce the magnitude of one or more components of the frequency content of the dc-link data.

In one embodiment, a test kit may be used for identifying frequency content of the dc-link data and/or engine speed data and diagnosing a condition of the engine or auxiliary equipment based on the frequency content of the data. For example, a test kit may include a controller that is operable to communicate with one or more dc-link sensors and/or engine speed sensors and operable to sample the associated data. The controller may be further operable to transform signals from the one or more sensors into a frequency content that represents frequency information of the engine or auxiliary equipment. The controller may be further operable to diagnose a condition of the engine or auxiliary equipment based on the frequency content of the generator data from the sensors. The test kit may further include one or more sensors for sensing dc-link parameters (e.g., dc-link voltage) and/or engine parameters (e.g., engine speed).

Vehicle system components that have a periodic nature to them, or which make periodic noise upon degradation or failure, may be able to be diagnosed by observing a dc-link parameter associated with a generator of the vehicle system.

In one embodiment, a system is provided having a controller that is operable to determine a condition of equipment electrically coupled to a generator based on frequency content of a measured dc-link parameter associated with the generator over time. The system also has a sensor to sense the dc-link parameter associated with the generator. The sensor is operable to communicate with the controller and to sample the dc-link parameter over time. The controller is further operable to extract the frequency content of the dc-link parameter.

In one embodiment, a system is provided having a controller that is operable to determine a condition of equipment operatively coupled to a rotating shaft of a reciprocating engine based at least in part on a frequency content of a measured rotational speed of the shaft over time. The system may also have a sensor to sense the rotational speed of the shaft and to sample the speed over time, and to communicate speed sample information to the controller. The controller may be further operable to extract the frequency content of the speed. The equipment may be an engine component that includes one or more of a cylinder, an injector, a pump, a valve, a piston, a compressor, or a blade. The controller may be further operable to diagnose the condition of the engine component based on a magnitude of a peak of the frequency content. The controller may be further operable to notify one or more of an operator of the engine, a dispatcher, or a service shop of a diagnosed condition of the engine.

In one embodiment, a method is provided. The method includes measuring a dc-link parameter associated with a generator that is coupled to an engine during operation using a dc-link sensor, and diagnosing a condition of an engine component of the engine based on frequency content of the dc-link parameter using at least a processor. The method may also include diagnosing the condition of the engine component based on a magnitude of a peak of the frequency content. The method may further include diagnosing the condition of the engine component based on one or more of a magnitude or a phase of the frequency content. The method may also include diagnosing the condition of the engine component based on a half-order component of the frequency content.

The method may include generating a historical file of diagnostic data and monitoring the historical file for changes in the diagnostic data over time and determining trends. For example, the method may include generating a historical file of diagnostic data, monitoring the historical file for diagnostic data that changes a determined amount over a period of time preceding a fault, and setting a failure threshold level in response to the monitoring. The method may also include predicting a failure of the engine component.

Figure 8:
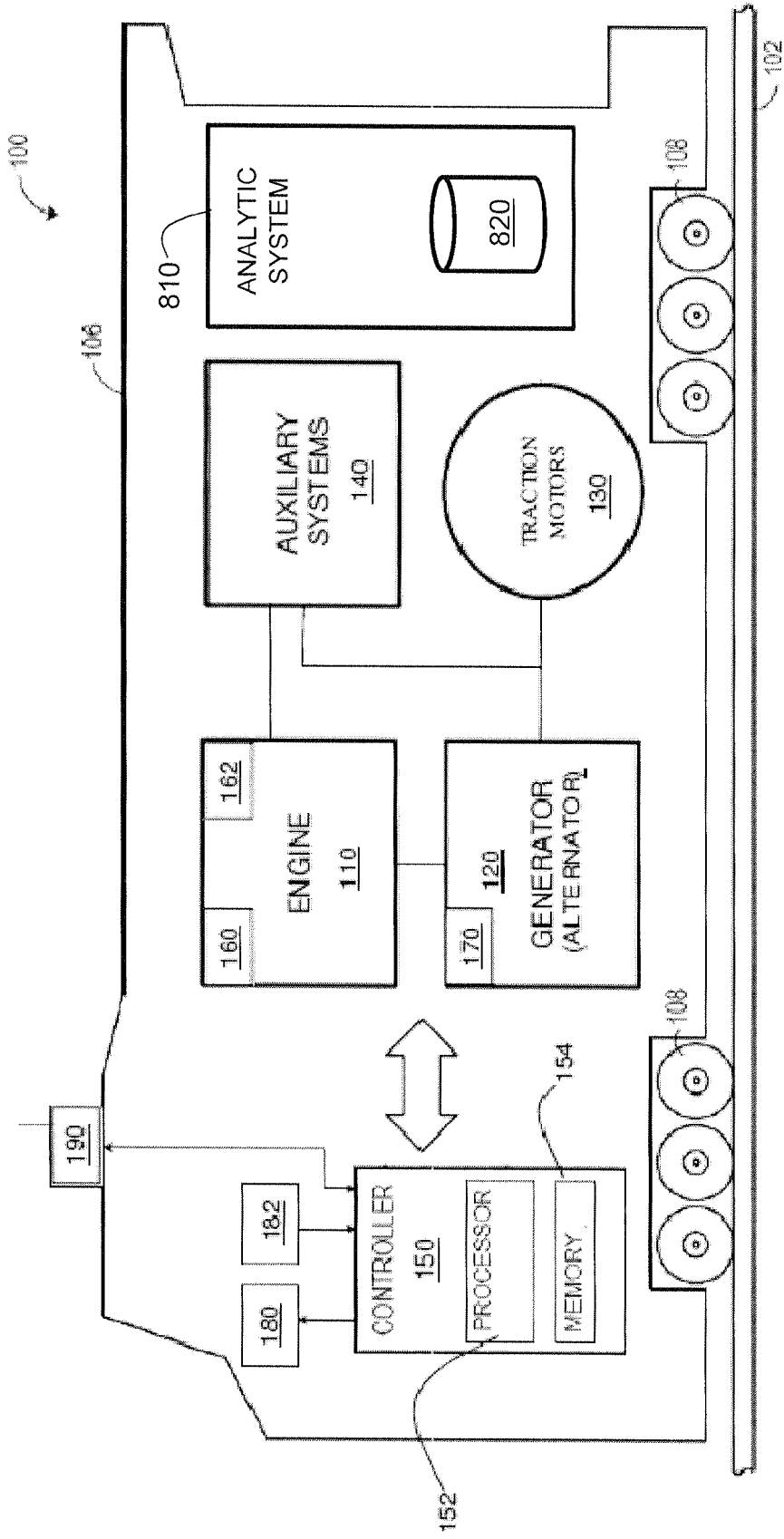
FIG. 8 is an illustration of an example embodiment of the vehicle system of FIG. 1, and further including an analytic system.

As an example, referring to FIG. 8, an analytic system 810, having a historical database 820, may capture data to generate a historical database 820 of diagnostic data that may be analyzed by the analytic system 810. The analytic system 810 may be onboard the locomotive of a train and be a part of the vehicle system 100. The analytic system 810 may be configured to communicate with the controller 150 (e.g., via wired means). Alternatively, the analytic system 810 may be an integral part of the controller 150.

Figure 9:
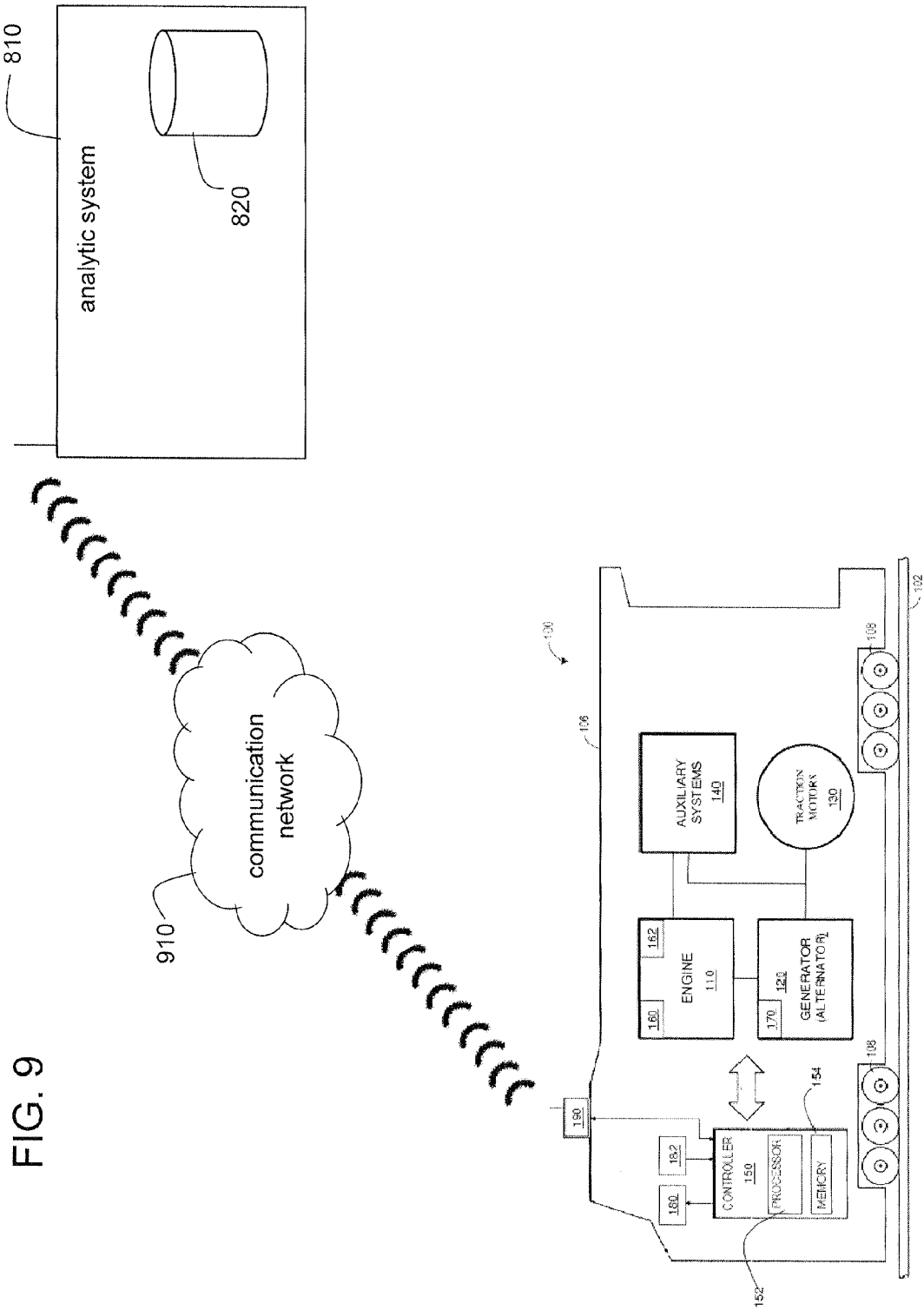
FIG. 9 is an illustration of an example embodiment of the vehicle system of FIG. 1 communicating with an external analytic system.

As a further alternative, referring to FIG. 9, the analytic system 810, having the historical database 820, may be at a remote location and may be configured to communicate with the vehicle system 100 of a train via the communication system 190 and an external communication network 910, for example. The external communication network 910 may include a cellular telephone network, a satellite communication network, some other wireless communication network, the internet, or some combination thereof, for example.

The database may be reviewed to determine incipient signal levels preceding a fault or failure of an engine component. The results of the review may be used to set a threshold level. Signal strength may be observed in the database and rate of change of signal strength over time may be determined from the database. For example, a 20% rise in a particular frequency component over a one-week span may be determined to occur, from the database information, before a particular engine component fails. As another example, it may be determined from the database information that, once a peak level of a particular frequency component doubles from where it started, a particular engine component is going to fail. Therefore, a calculated rate of change until 200% of original peak signal level may be used to determine a time to failure of the engine component.

The method may include determining a severity of a degraded condition of the engine component, for example, by determining which engine component is affected and to what extent it is compromised. The method may also include notifying one or more of an operator of the engine, a dispatcher, or a service shop of a diagnosed condition of the engine. The method may further include scheduling maintenance of the engine in response to diagnosing a condition of an engine component.

The method may include confirming a diagnosed condition of the engine component by cross-referencing the diagnosed condition with information stored in a diagnostic data archive. The diagnostic data archive may be similar to the historical database 820 but may also include additional information such as, for example, information derived from captured diagnostic data through analysis and information from maintenance records. For example, as a turbocharger component of an engine fails, it often has a vibration associated with it, and the turbocharger component may fail to send compressed air effectively to the engine cylinders resulting in an overall power loss. Also, exhaust gas may become constricted and the exhaust manifold temperature may increase as a result.

In observing a particular fault, cross-reference against other sensor data associated with that fault may be performed to determine if the diagnosed condition is likely to be correct. For example, it might be suspicious if a turbocharger component, having high vibration with no loss of power and no rise in temperature, is observed. By cross-referencing with information stored in a diagnostic data archive, another cause of turbocharger component vibration may be found that may be worth considering (e.g., failing bearings) rather than assuming that a diagnoses of a filing turbocharger component is true.

As a further example, wear of an engine component may be observed in a real-world situation, even though the diagnostic data archive shows that the engine component has been recently replaced. Such an indication may show that more detailed investigation is warranted before reaching a diagnostic conclusion.

The method may include confirming a diagnosed condition of an engine component by initiating, in a safe operating mode, at least one test that changes at least one operating parameter of the engine to intentionally change the diagnosed condition. For example, the firing of certain cylinders of an engine may be skipped, or changing the speed of the engine may be accomplished, and the resultant effect on the measured data may be observed. As another example, fuel injection to a particular engine cylinder may be increased and fuel injection to the other engine cylinders may be decreased as part of testing. The method may include taking at least one proactive step to avoid a catastrophic failure of the engine component such as, for example, de-rating the engine component in response to diagnosing a condition of the engine component or disabling the engine component in response to diagnosing a condition of the engine component. For example, an affected cylinder of an engine may be shut down.

In the specification and claims, reference will be made to a number of terms have the following meanings. The singular forms "a", "an" and "the" include plural referents unless the context clearly dictates otherwise. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Similarly, "free" may be used in combination with a term, and may include an insubstantial number, or trace amounts, while still being considered free of the modified term. Moreover, unless specifically stated otherwise, any use of the terms "first," "second," etc., do not denote any order or importance, but rather the terms "first," "second," etc., are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be". The terms "generator" and "alternator" are used interchangeably herein (however, it is recognized that one term or the other may be more appropriate depending on the application). The terms "frequency content" and "harmonic content" are used interchangeably herein and can refer to fundamental frequency (and/or phase) components and associated harmonic frequency (and/or phase) components above and below the fundamental components. The term "instructions" as used herein with respect to a controller or processor may refer to computer executable instructions.

The embodiments described herein are examples of articles, systems, and methods having elements corresponding to the elements of the invention recited in the claims. This written description may enable those of ordinary skill in the art to make and use embodiments having alternative elements that likewise correspond to the elements of the invention recited in the claims. The scope of the invention thus includes articles, systems and methods that do not differ from the literal language of the claims, and further includes other articles, systems and methods with insubstantial differences from the literal language of the claims. While only certain features and embodiments have been illustrated and described herein, many modifications and changes may occur to one of ordinary skill in the relevant art. The appended claims cover all such modifications and changes.

What is claimed is:

1. A system, comprising:
a controller that is operable to determine a condition of equipment electrically coupled to a generator based on frequency content of a measured dc-link parameter associated with the generator over time; and
a sensor configured to sense the dc-link parameter associated with the generator.

2. The system of claim 1, wherein the sensor is operable to communicate with the controller and to sample the dc-link parameter over time, and wherein the controller is further operable to extract the frequency content of the dc-link parameter.

3. A method, comprising:
measuring a dc-link parameter associated with a generator that is coupled to an engine during operation using a dc-link sensor; and
diagnosing a condition of an engine component of the engine based on frequency content of the dc-link parameter using at least a processor.

4. The method of claim 3, further comprising diagnosing the condition of the engine component based on a magnitude of a peak of the frequency content.

5. The method of claim 3, further comprising diagnosing the condition of the engine component based on one or more of a magnitude or a phase of the frequency content.

6. The method of claim 3, further comprising diagnosing the condition of the engine component based on a half-order component of the frequency content.

7. The method of claim 3, further comprising generating a historical file of diagnostic data and monitoring the historical file for changes in the diagnostic data over time.

8. The method of claim 3, further comprising generating a historical file of diagnostic data, monitoring the historical file for diagnostic data that changes a determined amount over a period of time preceding a fault, and setting a failure threshold level in response to the monitoring.

9. The method of claim 3, further comprising predicting a failure of the engine component.

10. The method of claim 3, further comprising determining a severity of a degraded condition of the engine component.

11. The method of claim 3, further comprising notifying one or more of an operator of the engine, a dispatcher, or a service shop of a diagnosed condition of the engine.

12. The method of claim 3, further comprising scheduling maintenance of the engine in response to diagnosing a condition of an engine component.

13. The method of claim 3, further comprising confirming a diagnosed condition of the engine component by cross-referencing the diagnosed condition with information stored in a diagnostic data archive.

14. The method of claim 3, further comprising confirming a diagnosed condition of the engine component by initiating, in a safe operating mode, at least one test that changes at least one operating parameter of the engine to intentionally change the diagnosed condition.

15. The method of claim 3, further comprising taking at least one proactive step to avoid a catastrophic failure of the engine component.

16. The method of claim 3, further comprising de-rating the engine component in response to diagnosing a condition of the engine component.

17. The method of claim 3, further comprising disabling the engine component in response to diagnosing a condition of the engine component.

* * * * *